US006201605B1

(12) United States Patent
Shiga (10) Patent No.: US 6,201,605 B1
(45) Date of Patent: Mar. 13, 2001

(54) OPTICAL DETECTING APPARATUS AND COORDINATE INPUTTING APPARATUS USING THE DETECTING APPARATUS

(75) Inventor: Sadakazu Shiga, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/085,652

(22) Filed: May 27, 1998

(30) Foreign Application Priority Data

May 28, 1997 (JP) .................................................. 9-138996

(51) Int. Cl.$^7$ ................................................. G01B 11/00
(52) U.S. Cl. ........................ 356/394; 376/372; 356/376; 356/372
(58) Field of Search ................... 356/394, 376, 356/372; 345/165

(56) References Cited

U.S. PATENT DOCUMENTS

| | | | |
|---|---|---|---|
| 5,249,034 | * | 9/1993 | Minato .................................. 356/394 |
| 5,652,657 | * | 7/1997 | Yoshii et al. .......................... 356/394 |
| 5,729,346 | * | 3/1998 | Jou ........................................ 356/394 |

* cited by examiner

*Primary Examiner*—Frank G. Font
*Assistant Examiner*—Reginald A. Ratliff
(74) *Attorney, Agent, or Firm*—Brinks Hofer Gilson & Lione (57) ABSTRACT

An optical detecting apparatus designed to reduce the time taken to stabilize the operation after a moment at which a power supply for the apparatus is turned on, as well as to limit the power consumption in a standby state. Three operating modes: a normal mode, an intermittent mode, and a precharge mode are changed by controlling two switches sw-Led and sw-Ref. In the normal mode, both the switches sw-Led and sw-Ref are maintained in the on state and the circuit of the invention is used for the same operation as the conventional circuit. In the intermittent mode, for the purpose of achieving low power consumption in the standby state, both the switches sw-Led and sw-Ref are turned on and off at a predetermined on-off ratio to make the circuit operate in an intermittent manner (that is, by turning on and off light emitting diodes at a predetermined on-off ratio). In the precharge mode, the switch sw-Led is turned on immediately after turning on the power supply while the switch sw-Ref is maintained in the off state, thereby quickly charging capacitors.

11 Claims, 6 Drawing Sheets

OPTICAL DETECTING APPARATUS AND COORDINATE INPUTTING APPARATUS USING THE DETECTING APPARATUS

BACKGROUND OF THE INVENTION

1. Field of the Invention

The present invention relates to an optical detecting apparatus (optical encoder) and a coordinate inputting apparatus using the detecting apparatus.

2. Description of the Related Art

Coordinate inputting apparatuses, e.g., a mouse and a trackball used to input position coordinate data indicating the position of a cursor or the like on a display screen of a personal computer or the like, are known. Such apparatuses have a ball and are capable of changing the displayed position of a cursor according to the direction and amount of rotation of the ball.

Figure 4:
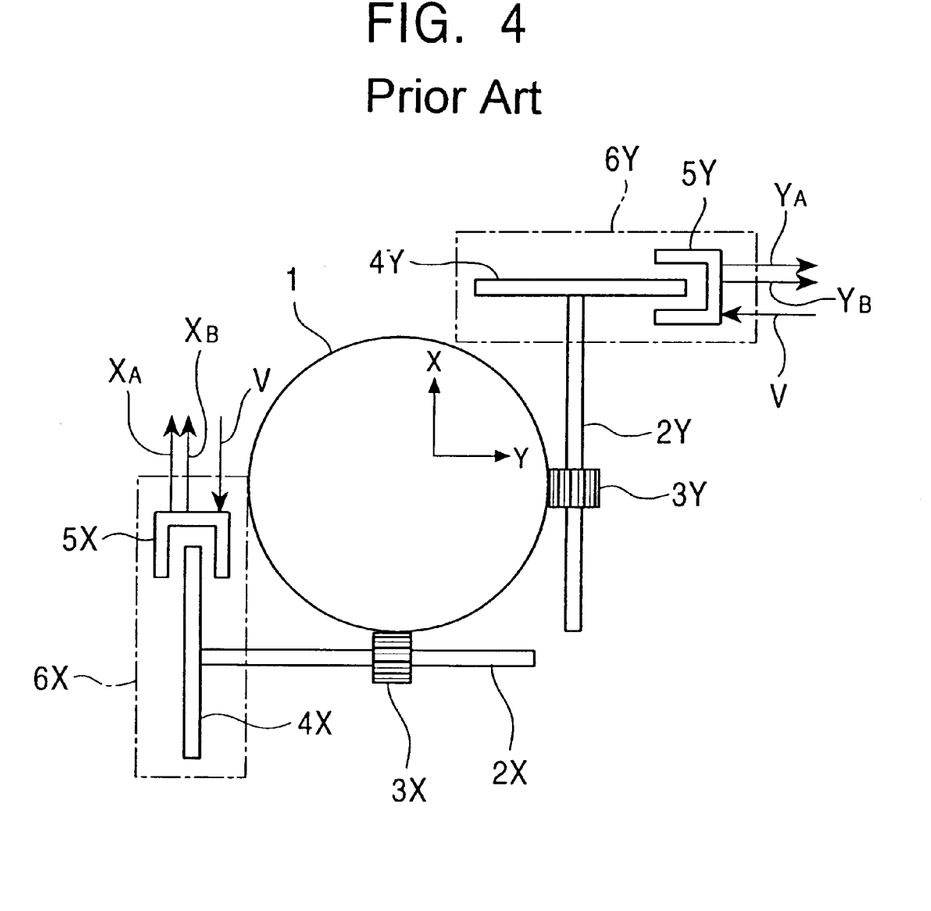
FIG. 4 is a diagram showing the mechanism of a coordinate inputting apparatus.

FIG. 4 is a diagram showing the construction of a mechanism of such a coordinate inputting apparatus.

A ball 1 shown in FIG. 4 is supported so as to be rotatable about its center point. Rollers 3X and 3Y fixed to rotatable shafts 2X and 2Y are pressed against the surface of the ball 1 at two points in radial directions form the center point of the ball 1 at an angle of 90° from each other. The direction of arrow X in FIG. 4 will be referred to as "+X direction" in the XY coordinate system (the opposite direction referred to as "−X direction") and the direction of arrow Y will be referred to as "+Y direction" in the XY coordinate system (the opposite direction referred to as "−Y direction"). Disk-like choppers 4X and 4Y are respectively fixed to end portions of the shafts 2X and 2Y. A plurality of slits uniform in size are formed in an outer portion of each of the choppers 4X and 4Y along the entire circumferential length thereof.

A photointerrupter 5X is provided in association with the chopper 4X while a photointerrupter 5Y is provided in association with the chopper 4Y. Each of the photointerrupters 5X and 5Y has light emitting elements (not shown) and light receiving elements (not shown). The photointerrupters 5X and 5Y are disposed so that the outer portion of each chopper is interposed between the light emitting elements and the light receiving elements. The chopper 4X and the photointerrupter 5X form an optical encoder unit 6X while the chopper 4Y and the photointerrupter 5Y form an optical encoder unit 6Y.

In this arrangement, when the ball 1 rotates, the shafts 2X and 2Y are rotated by the rollers 3X and 3Y, and the choppers 4X and 4Y are also rotated thereby. On the other hand, a power supply voltage V is applied to the photointerrupters 5X and 5Y to cause the light emitting elements to constantly emit light. Therefore, as the choppers 4X and 4Y rotate, blade portions between the slits formed in the outer portion of each chopper successively passes the place between the light emitting elements and the light receiving elements of the corresponding photointerrupter 5X or 5Y. Light traveling from the light emitting elements to the light receiving elements is thereby chopped so that the levels of output signals XA and XB or YA and YB change in a pulsating manner.

Figure 5:
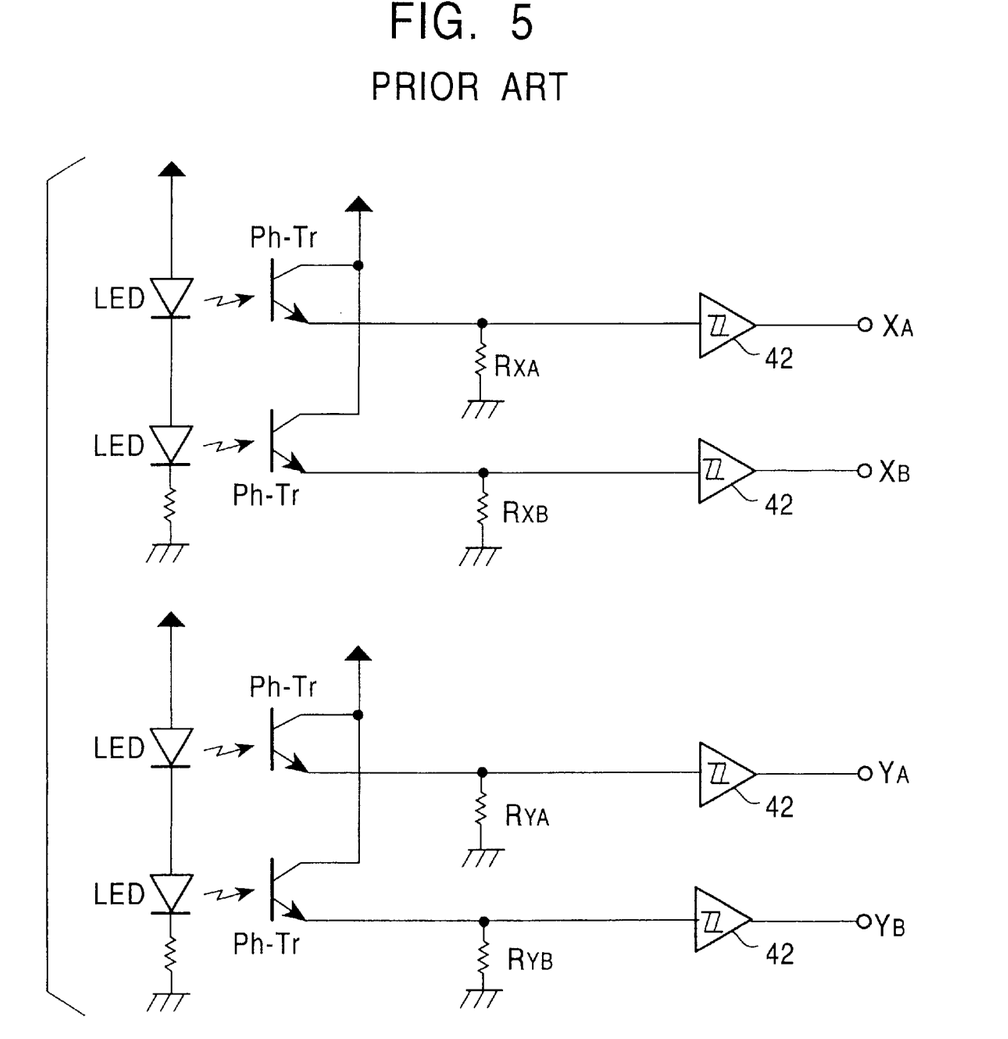
FIG. 5 is a circuit diagram showing the configuration of a conventional optical detecting apparatus (optical encoder)

FIG. 5 is a circuit diagram showing the configuration of an example of the optical encoder unit of the above-described coordinate inputting apparatus.

In this example, the light emitting elements of the photointerrupter 5A are light emitting diodes LED while the light receiving elements of the photointerrupter 5A are phototransistors Ph-Tr.

According to the rotation of the chopper 4X or 4Y, output light from each of the light emitting diodes LED is allowed to travel to the corresponding phototransistor Ph-Tr or stopped. When output light from the light emitting diode LED reaches the phototransistor Ph-Tr, the phototransistor Ph-Tr is turned on. When the phototransistor Ph-Tr is turned on, a signal of a predetermined potential is input to a Schmitt trigger gate 42 via the phototransistor Ph-Tr. The Schmitt trigger gate 42 removes noise from the input signal and outputs the signal.

Of the outputs signals XA, XB, YA, and YB generated in this manner, output signals XA and XB are used for detecting an X-axis component of the rotation of the ball 1 while output signals YA and YB are used for detecting a Y-axis component of the rotation of the ball 1.

Output signals XA and XB change in phase relation between rises of their pulses according to the direction of rotation of the chopper 4X (i.e., the direction of rotation of the ball 1). That is, when the ball 1 rotates in the +X direction, output signal XA rises earlier than output signal XB. When the ball 1 rotates in the −X direction, output signal XB rises earlier than output signal XA. The direction of rotation of the chopper 4X can be detected from the phase relationship between output signals XA and XB.

Output signals YA and YB also have a similar phase relationship.

The phototransistors shown in FIG. 5 have different light receiving sensitivities (that is, vary in light receiving sensitivity). Therefore, there is a need to correct variations in the receiving sensitivities of the phototransistors by adjusting the resistance values of resistors RXA, RAB, RYA, and RYB at the time of assembly of the apparatus.

Also, in the circuit shown in FIG. 5, the operating voltage range is considerably restricted (or fixed).

Figure 6:
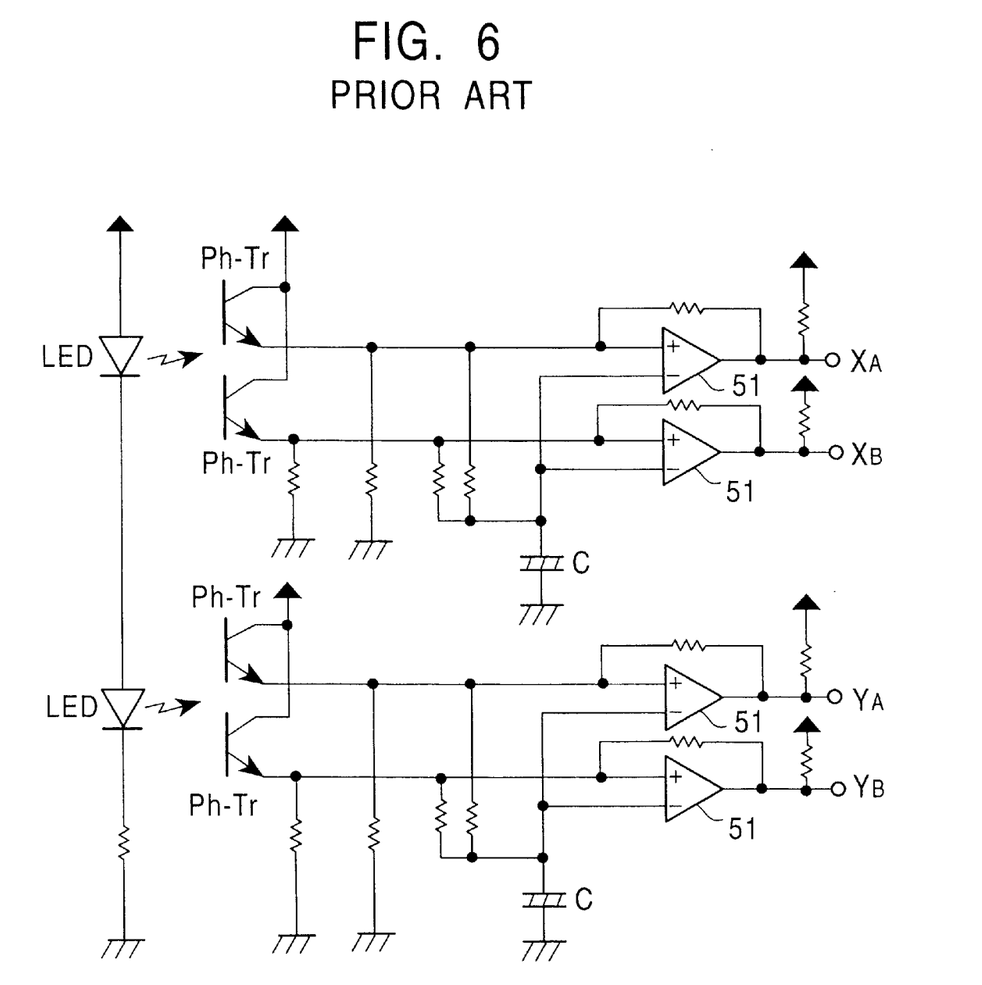
FIG. 6 is a circuit diagram showing the configuration of another conventional optical detecting apparatus.

FIG. 6 shows the configuration of another conventional optical encoder unit designed to solve these problems. Output signals XA, XB, YA, and YB shown in FIG. 6 correspond to those in the circuit shown in FIG. 5.

In the circuit shown in FIG. 6, each of phototransistors Ph-Tr is turned on and off according to the rotation of chopper 4X or 4Y to change its emitter potential, as is the corresponding transistor in the circuit shown in FIG. 5.

Each of comparators 51 compares the emitter potential of one of the phototransistors Ph-Tr with a predetermined reference potential and outputs the comparison result as output signal XA, XB, YA, or YB.

Each of capacitors C is charged by emitter currents form the phototransistors to produce and hold the reference potential when the power supply is turned on.

In the circuit shown in FIG. 6, both the two potentials compared by one comparator 51 are produced from a common potential (emitter potential of phototransistor Ph-Tr). Therefore, a variation in the light receiving sensitivity of the corresponding phototransistor Ph-Tr equally influences the two potentials compared by the comparator 51. Accordingly, such a variation is canceled out at the time of comparison of the two potentials. In the circuit shown in FIG. 6, therefore, there is no need for correction of variations in the light receiving sensitivities of the phototransistors Ph-Tr.

Also in the circuit shown in FIG. 6, both the two potentials compared by one comparator 51 are produced from the common power supply line connected to the corresponding pohototransistor Ph-Tr. Therefore, a variation in the power supply voltage equally influences the two potentials compared by the comparator 51. Accordingly, such a variation is canceled out at the time of comparison of the two potentials. In the circuit shown in FIG. 6, therefore, the operating voltage range of the power supply can be increased.

The circuit shown in FIG. 6, however, requires charging of the capacitors C after a moment at which the power supply is turned on. There is, therefore, a problem of a long time (about five seconds, for example) being taken to stabilize the operation after turning on the power supply.

Further, if, in the circuits shown in FIGS. 5 and 6, the power supply is off when the mouse is stopped, and if the power supply is turned on after the movement of the mouse has been started, then the mouse operation cannot be followed up to detect the distance by which the mouse is moved. In these circuits, therefore, the light emitting diodes LED must always be maintained in the light emitting state to monitor the rotation of each of choppers 4X and 4Y even when the mouse is stopped. This is an obstacle to saving the power consumed by the light emitting diodes. The power consumption by light emitting elements has been a serious consideration with respect to battery drive, in particular.

SUMMARY OF THE INVENTION

In view of these circumstances, an object of the present invention is to provide an optical light detecting apparatus (optical encoder unit) designed based on the arrangement shown in FIG. 6 so as to reduce the time taken to stabilize the operation after a moment at which the power supply is turned on, as well as to reduce the power consumption in a standby state.

To achieve the above-described object, according to the present invention, there is provided an optical detecting apparatus comprising means for outputting light, stop and pass means for repeating stopping and passing the light output from the light emitting means a certain number of times according to a detected quantity of a predetermined detection object, light receiving means for outputting a signal of a predetermined potential by receiving light passing through the stop and pass means, reference potential generation means for generating a predetermined reference potential by charging, comparison means for comparing a potential output from the light receiving means with the reference potential, calculation means for calculating the detected quantity based on the result of comparison performed by the comparison means, and charge control means for quickly charging the reference potential generation means by applying a voltage higher than a normal voltage to the reference potential generation means when a power source for the apparatus is turned on.

According to the present invention, the charge control means applies a voltage higher than a normal voltage to the reference potential generation means to quickly charge the same when the power source is turned on, thereby reducing the time taken to stabilize the operation after turning on the power source.

DESCRIPTION OF THE PREFERRED EMBODIMENT

An embodiment of the present invention will be described below with reference to the accompanying drawings.

Figure 1:
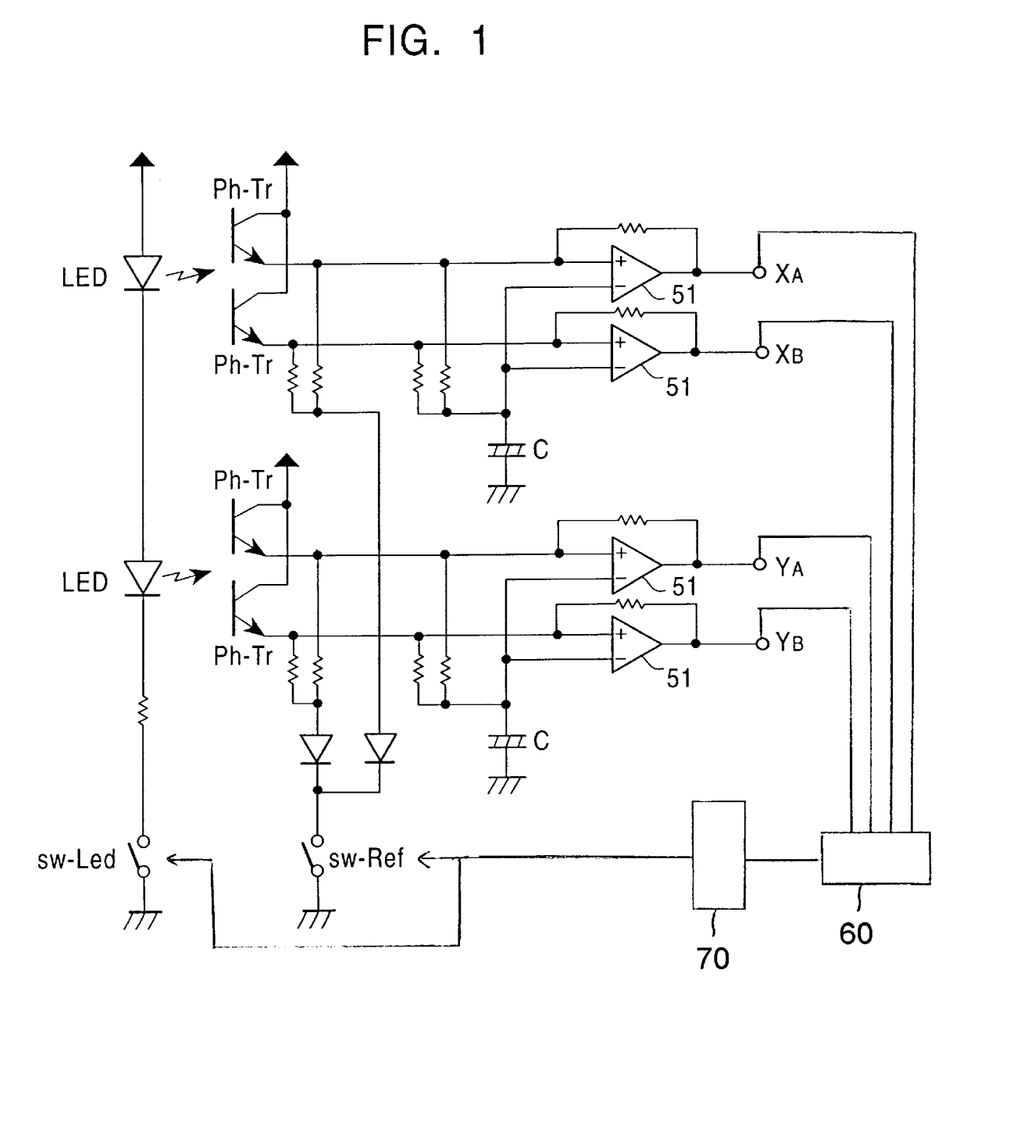
FIG. 1 is a circuit diagram showing the configuration of an optical detecting apparatus (optical encoder) which represents an embodiment of the present invention.

FIG. 1 is a circuit diagram showing the configuration of an optical detecting apparatus (optical encoder) which represents an embodiment of the present invention. In FIG. 1, components corresponding to those shown in FIGS. 5 and 6 are indicated by the same reference characters. The description for the corresponding components will not be repeated.

In the circuit shown in FIG. 1, two switches sw-Led and sw-Ref are newly provided.

The circuit of this embodiment has three modes: (1) a normal mode, (2) an intermittent mode, and (3) a precharge mode.

Each mode is selected by a a calculation section (60) that communicates with a control section (70). The calculation section (60) and control section (70) may either be separate components or part of a computer (and realized using a computer program such as a mouse driver). The control section (70) further may be formed of a central processing unit (CPU) or the like.

Each of these modes will be described briefly below.

(1) Normal Mode

The normal mode is a mode in which the circuit (see FIG. 1) is made to operate in the same manner as the conventional circuit (see FIG. 6). In the normal mode, both the switches sw-Led and sw-Ref are maintained in the on state.

(2) Intermittent Mode

The intermittent mode is a mode in which the circuit is made to operate in an intermittent manner (that is, by turning on and off light emitting diodes LED at a predetermined on-off ratio) for the purpose of reducing the power consumption. In the intermittent mode, the control section turns on and off each of the switches sw-Led and sw-Ref at a predetermined on-off ratio.

(3) Precharge Mode

The precharge mode is a mode in which capacitors C are quickly charged immediately after turning on the power supply. In the precharge mode, the control section maintains the switch sw-Led in the on state and maintains the switch sw-Ref in the off state.

The operation of the optical detecting apparatus arranged as described above will next be described.

For ease of explanation, the operation will be described with respect to the circuit relating to one output signal from the circuit shown in FIG. 1 (output signal XA) by way of example.

Figure 2:
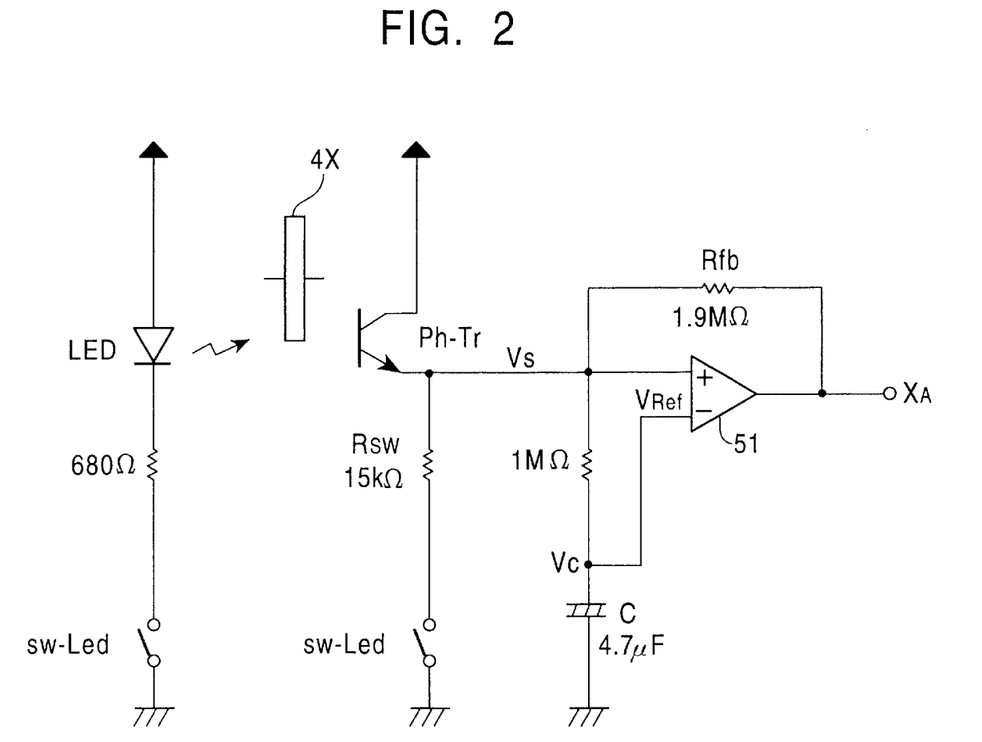
FIG. 2 is a circuit diagram of a portion of the circuit of FIG. 1 relating to output signal XA.
Figure 3A:
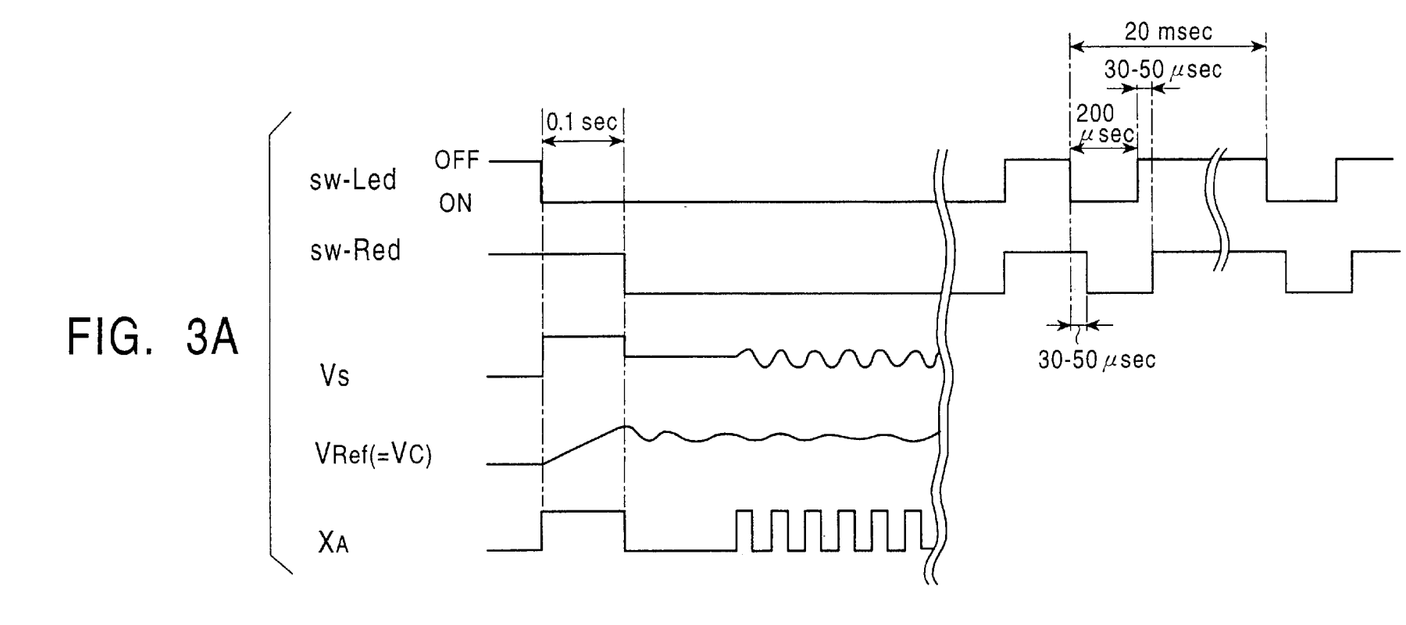
FIGS. 3A and 3B are timing charts of an example of the operation of the circuit shown in FIG. 2.
Figure 3B:
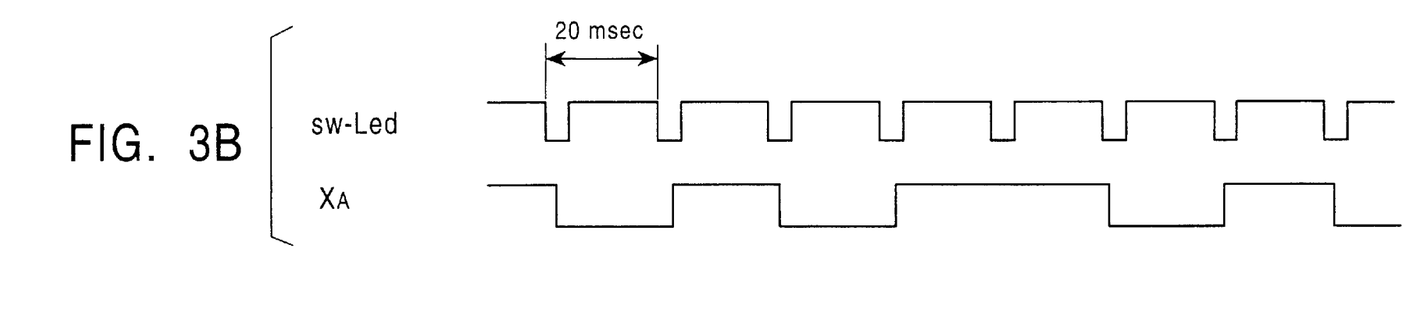

FIG. 2 is a circuit diagram of a portion relating to output signal XA of the circuit shown in FIG. 1, and FIGS. 3A and 3B are timing charts of an example of the operation of the circuit shown in FIG. 2.

First, when a user turns on the power supply by operating a predetermined switch (not shown), the control section makes the circuit start operating in the precharge mode.

In the precharge mode, as shown in FIG. 3A, the control section maintains the switch sw-Led for, for example, 0.1 second and maintains the switch sw-Ref in the off state. In this situation, no voltage drop occurs across resistor Rsw, so that potential VS is set to a potential (e.g., 5.0 V) higher than a potential (e.g., 2.5 V) in the normal mode. Potential VC is thereby made higher than the level in the normal mode, so that the capacitor C is forcibly charged quickly.

When a time of 0.1 second elapses after the start of the precharge mode, the control section makes the circuit start operating in the normal mode.

In the normal mode, the control section maintains both the switches sw-Led and sw-Ref in the on state, thereby making the circuit operate in the same manner as the conventional circuit (see FIG. 6). In the normal mode, potential VS changes in the range of 0.5 to 1.0 V with the rotation of chopper 4X (on-off changes in the state of the phototransistor Ph-Tr caused by the rotation of chopper 4X) (see FIG. 3A). Potential VC also changes correspondingly.

On the other hand, in the normal mode, the control section monitors the rotation of chopper 4X (changes in the output signal from comparator 51 caused by the rotation of chopper 4X). If, during this monitoring, no amount of rotation of chopper 4X is detected in a predetermined time period (e.g., 10 seconds), then the control section makes the circuit start operating in the intermittent mode.

In the intermittent mode, the control section turns on and off the switches sw-Led and sw-Ref at a predetermined on-off ratio. In this embodiment, this ratio, i.e., ratio of the on period to the off period, is set to 1:100.

That is, in this embodiment, as shown in FIG. 3A, the period of on-off changes in the intermittent mode is set to 20 msec (=20000 $\mu$sec), the on period in this period is set to 0.2 msec (=200 $\mu$sec), and the off period is set to 19.8 msec (=19800 $\mu$sec). The power consumption of the circuit of this embodiment is thereby reduced to 1/100 of that in the normal mode.

As shown in FIG. 3A, the control section does not simultaneously turn on and off the switches sw-Led and sw-Ref; it delays the on-off operation of the switch sw-Ref by 30 to 50 $\mu$sec from the on-off operation of the switch sw-Led by considering the delay of the operation of phototransistor Ph-Tr.

In the off period (19.8 msec) in the intermittent mode, potential VC can change by self-discharge of capacitor C or the like.

In the circuit of this embodiment, if potential VC changes, a feedback potential opposite from the change is applied from output signal XA of comparator 51 to capacitor C via resistor Rfb, thereby correcting the change in potential VC.

Even though this correction is made, it is possible that potential VC will gradually become different from the charged value (in the precharge mode) by accumulation of errors in the correction. In the circuit of this embodiment, however, the switches sw-Led and sw-Ref are turned on with recurrence of the on period at intervals of 20 msec, thereby correcting potential VC to the charged value. In this manner the value of output signal XA is corrected at intervals of 20 msec as shown in FIG. 3B. (If the value of output signal XA is correct, no change is exhibited therein.)

In the intermittent mode, the control section also monitors the rotation of chopper 4X (changes in the output signal of comparator 51 caused by the rotation of chopper 4X) in the on period in the period of on-off changes.

If an amount of rotation of chopper 4X is thereby detected, the control section makes the circuit start operating in the normal mode. If still no rotation of chopper 4X is detected, the control section continues the intermittent mode.

If no rotation of chopper 4X is detected through a predetermined number of cycles of the intermittent modes, the control section automatically shuts off the power supply to the circuit.

The above is the operation of the optical detecting apparatus arranged as described above.

The embodiment of the present invention has been described in detail with reference to the drawings. However, the specific arrangement of the present invention is not limited to the described embodiment, and the present invention comprises various design changes or the like not departing from the scope and gist of the invention.

According to the present invention, as described above, quick charging is performed when the power supply is turned on, so that the time taken to stabilize the operation after turning on the power supply is reduced.

According to the present invention, it is also possible to reduce the power consumption in the standby state.

What is claimed is:

1. An optical detecting apparatus comprising:
    means for outputting light;
    stop and pass means for repeating stopping and passing the light output from said light emitting means a certain number of times according to a detected quantity of a predetermined detection object;
    light receiving means for outputting a signal of a predetermined potential by receiving light passing through said stop and pass means;
    reference potential generation means for generating a predetermined reference potential by charging;
    comparison means for comparing a potential output from said light receiving means with the reference potential;
    calculation means for calculating the detected quantity based on the result of comparison performed by said comparison means; and
    charge control means for quickly charging said reference potential generation means by applying a voltage higher than a normal voltage to said reference potential generation means when a power source for the apparatus is turned on.

2. An optical detecting apparatus according to claim 1, wherein said reference potential generation means is charged by having its one end connected to a charging potential, said charge control means including:
    charge change means for changing connection and disconnection between said charging potential and a ground by a predetermined resistance value; and
    control means for disconnecting, by using said charge change means, said charging potential and the ground for a predetermined time period after a moment at which the power source for the apparatus is turned on.

3. A coordinate inputting apparatus using an optical detecting apparatus according to claim 1, wherein the predetermined detection object comprises an amount of movement on a predetermined coordinate axis.

4. An optical detecting apparatus comprising:
    means for emitting light by being supplied with electric power from a predetermined power source;
    stop and pass means for repeating stopping and passing the light output from said light emitting means a certain number of times according to a detected quantity of a predetermined detection object;
    light receiving means for outputting a signal of a predetermined potential by receiving light passing through said stop and pass means;

reference potential generation means for generating a predetermined reference potential by charging;

comparison means for comparing a potential output from said light receiving means with the reference potential;

calculation means for calculating the detected quantity based on the result of comparison performed by said comparison means; and power control means for changing the power supply to said light emitting means to power supply and stop at a predetermined ratio if no change in state from stop to pass or pass to stop occurs in said stop and pass-means through a predetermined time period.

5. An optical detecting apparatus according to claim 4, wherein the ratio of power supply and stop by said power control means is 1:100.

6. An optical detecting apparatus according to claim 4, wherein said power control means includes:

power change means for changing connection and disconnection between said light emitting means and said power source; and control means for connecting and disconnecting said light emitting means and said power source at the predetermined ratio.

7. A coordinate inputting apparatus using an optical detecting apparatus according to claim 4, wherein the predetermined detection object comprises an amount of movement on a predetermined coordinate axis.

8. An optical detecting apparatus comprising:

means for emitting light by being supplied with electric power from a predetermined power source;

stop and pass means for repeating stopping and passing the light output from said light emitting means a certain number of times according to a detected quantity of a predetermined detection object;

light receiving means for outputting a signal of a predetermined potential by receiving light passing through said stop and pass means;

reference potential generation means for generating a predetermined reference potential by charging;

comparison means for comparing a potential output from said light receiving means with the reference potential;

calculation means for calculating the detected quantity based on the result of comparison performed by said comparison means; and charge and power control means for quickly charging said reference potential generation means by applying a voltage higher than a normal voltage to said reference potential generation means when a power source for the apparatus is turned on, said charge and power control means also for changing the power supply to said light emitting means to power supply and stop at a predetermined ratio if no change in state from stop to pass or pass to stop occurs in said stop and pass means through a predetermined time period.

9. An optical detecting apparatus according to claim 8, wherein the ratio of power supply and stop by said charge and power control means is 1:100.

10. An optical detecting apparatus according to claim 8, wherein said reference potential generation means is charged by having its one end connected to a charging potential, said charge and power control means includes:

charge change means for changing connection and disconnection between said charging potential and a ground by a predetermined resistance value;

power change means for changing connection and disconnection between said light emitting means and said power source; and control means for disconnecting, by using said charge change means, said charging potential and the ground for a predetermined time period after a moment at which the power source for the apparatus is turned on, for connecting and disconnecting said light emitting means and said power source at the predetermined ratio, and for correcting the reference potential of said reference potential generation means by setting said power change means in the connecting state when said charge change means is set in th econnecting state.

11. A coordinate inputting apparatus using an optical detecting apparatus according to claim 8, wherein the predetermined detection object comprises an amount of movement on a predetermined coordinate axis.

* * * * *

UNITED STATES PATENT AND TRADEMARK OFFICE
CERTIFICATE OF CORRECTION

PATENT NO.    : 6,201,605 B1
DATED         : March 13, 2001
INVENTOR(S)   : Sadakazu Shiga It is certified that error appears in the above-identified patent and that said Letters Patent is hereby corrected as shown below:

Claim 4,
Line 21, change "pass-means" to -- pass means --.

Claim 10,
Line 20, change "th econnecting" to -- the connecting --.

Signed and Sealed this

Eighth Day of January, 2002

Attest:

JAMES E. ROGAN
Attesting Officer    Director of the United States Patent and Trademark Office